United States Patent [19]
Christell

[11] Patent Number: 5,332,771
[45] Date of Patent: Jul. 26, 1994

[54] HIGH-PERFORMANCE WATER-BASED CHLOROPRENE POLYMER ADHESIVE COMPOSITION

[75] Inventor: Lance A. Christell, Prospect, Ky.

[73] Assignee: E. I. Du Pont de Nemours and Company, Wilmington, Del.

[21] Appl. No.: 986,449

[22] Filed: Dec. 7, 1992

[51] Int. Cl.$^5$ .......................... C08L 9/10; C08K 5/36
[52] U.S. Cl. ................................. 524/270; 524/432; 524/433; 524/552
[58] Field of Search ............... 524/270, 432, 433, 552

[56] References Cited

U.S. PATENT DOCUMENTS

| | | | |
|---|---|---|---|
| 3,651,037 | 3/1972 | Snow | 260/92.3 |
| 3,988,506 | 10/1976 | Dohi et al. | 526/218 |
| 4,029,625 | 6/1977 | Denda et al. | 524/511 |
| 4,042,554 | 8/1977 | Poskitt | 524/447 |
| 4,130,528 | 12/1978 | Chen | 260/29.7 |
| 4,463,110 | 7/1984 | Perlinski et al. | 523/409 |

OTHER PUBLICATIONS

The Structure of Neoprene. VIII. Effect of Polymerization Temperature on Polymer Properties by J. T. Maynard and W. E. Mochel—Journal of Polymer Science, vol. XVIII, pp. 227–234 (1955).

*Primary Examiner*—Paul R. Michl
*Assistant Examiner*—Edward Cain

[57] ABSTRACT

An adhesive composition resistant to elevated temperature and particularly suitable for bonding to a substrate a composite structure thermoformable at a high temperature is an aqueous dispersion containing as its main components a copolymer of 2-chloro-1,3-butadiene with 2,3-dichloro-1,3-butadiene made at a temperature of at most 35° C., preferably at most 25° C., a rosin ester, and zinc oxide or magnesium oxide. The solids content of the adhesive composition is about 40–65 weight percent, preferably 50–60 weight percent. The composition may also contain, and usually does contain, further additives such as, for example, stabilizers, antioxidants, surfactants, and gum rosin esters.

10 Claims, No Drawings

HIGH-PERFORMANCE WATER-BASED CHLOROPRENE POLYMER ADHESIVE COMPOSITION

BACKGROUND OF THE INVENTION

This invention relates to a water-based chloroprene polymer adhesive composition particularly suitable for bonding to substrates composite structures which can be subjected to postforming into useful shapes at elevated temperatures, e.g., in the neighborhood of 120° C. or higher.

A composite structure such as, e.g., a multilayer laminate for decorative tabletops or countertops, often must be postformed at high temperatures in order to be fitted to the shape of the substrate. For example, the composite structure may be first bonded to the substrate at ambient or a moderately elevated temperature in a manner to leave a portion of the composite structure overhanging one or more edges of the substrate. Those portions are then bent at a higher temperature to cover the edges, and those bent portions are bonded to the edges, or both to the edges and to the underside of the substrate while still hot. As the thus produced assembly cools, stresses develop in the original composite structure which can cause warping and consequently separation of the laminate from the substrate. It is, therefore, very important to assure that the bond between the substrate and the laminate is capable of withstanding such elevated temperatures without failure.

Chloroprene is the common name of 2-chloro-1,3-butadiene. It is known to homopolymerize and copolymerize chloroprene to high molecular weight elastomeric materials, which often are referred to in the chemical industry as the neoprenes. The term "neoprene" will be occasionally used herein to designate a chloroprene polymer.

Neoprene adhesives are well known. Frequently they are formulated as contact adhesives, which are available in the form of cements, i.e., solutions in organic liquids. Water-based neoprene contact adhesive compositions also are known. However, the presently available water-based neoprene adhesives do not provide bond strengths comparable to those of neoprene cements. Further, those bonds usually cannot withstand temperatures in excess of about 100° C., which are encountered when postforming and bonding composite structures, without substantial loss of strength.

Still, because of the fire hazards associated with solutions in organic liquids, as well as of the growing concern for the environment, it is no longer desirable to use solvent-based adhesives, and it is preferred to replace them to the extent possible with water-based adhesives.

It is known that polymerization of chloroprene at low temperature increases the crystallization rate of the polymer. See J. T. Maynard, J. Poly. Sci., vol. 18, p. 227 (1955). Neoprene cements usually contain polychloroprene made at a low temperature and have a high green bond strength. Those bonds retain sufficient strength in the high temperature postforming and bonding of composite structures.

Copolymers of chloroprene with comonomers which would retard crystallization, such as, e.g., 2,3-dichloro-1,3-butadiene, also are known. However, copolymers of chloroprene with 2,3-dichloro-1,3-butadiene are known to be deficient in their bonding strength and, therefore, must be formulated with additional special components such as, e.g., polyamines, epoxy compounds, and additionally tackifiers. The art discloses a number of special conditions required for preparing chloroprene copolymers having high bond strength, or special comonomers that would assure good bonding properties, or special additives required to improve the bonding properties of chloroprene copolymers. See, e.g., U.S. Pat. Nos. 4,130,528 to Chen and 4,463,110 to Perlinski et al.

There is a need in the industry for a water-based neoprene adhesive composition having high green bond strength, capable of substantially maintaining its bond strength at elevated temperatures, and capable of being formulated with conventional additives.

SUMMARY OF THE INVENTION

According to the present invention, there is provided an adhesive composition consisting essentially of about 100 parts of a copolymer of 2-chloro-1,3-butadiene with 2,3-dichloro-1,3-butadiene, the proportion of 2,3-dichloro-1,3-butadiene being 2% to 20% based on the total weight of the copolymer; 15 to 75 parts of rosin ester; 1 to 10 parts of zinc oxide or magnesium oxide, all parts being by weight; and a sufficient amount of water to make the solids content of the composition 40–65 weight percent;

with the proviso that said copolymer of 2-chloro-1,3-butadiene with 2,3-dichloro-1,3-butadiene is prepared by emulsion copolymerization of the comonomers in the presence of 0.05 to 0.3 weight percent of a dialkylxanthogen disulfide, based on the total weight of the two comonomers, at a temperature within the range of about 0° C. to 35° C.

The term "consisting essentially of" means that components that would materially detract from the operability of the present invention are absent, while other components may be present.

DETAILED DESCRIPTION OF THE INVENTION

The copolymer of 2-chloro-1,3-butadiene with 2,3-dichloro-1,3-butadiene (the latter being sometimes abbreviated herein to DCBD) can be made by a free radical-initiated emulsion polymerization process, as generally described in U.S. Pat. No. 3,651,037 to Snow. A suitable copolymer, made in the presence of diisopropylxanthogen disulfide at a temperature of 10° C., is disclosed in Comparative Example 4 of U.S. Pat. No. 3,988,506 to Dohi et al. Copolymerization is normally carried out in the presence of a chain transfer agent (or telogen), and in this process the telogen is a dialkylxanthogen disulfide. The polymer thus contains dialkyxanthogen disulfide end groups and sometimes is said to be xanthogen disulfide-modified. The alkyl groups of dialkylxanthogen disulfide normally are lower alkyl groups, preferably $C_1$–$C_4$ alkyl. While other telogens frequently are used in the chloroprene polymerization processes, especially alkyl mercaptans, it has been surprisingly found that mercaptan-modified copolymers of chloroprene with DCBD do not have the properties desired in the present invention. This is quite the opposite of the preference expressed in the above-cited Dohi patent. The preferred copolymerization temperature is at most 25° C. A dialkyl xanthogen disulfide-modified neoprene copolymerized at 45° C. gave a significantly poorer performance.

Copolymerization is carried to a conversion of at most about 90%, at which point it is stopped by the addition of a polymerization inhibitor, e.g., phenothiazine, and is stabilized by the addition of an agent such as, e.g., sodium salt of disproportionated abietic acid. Unpolymerized monomers are steam-distilled and recovered. The required further additives are then added to the remaining neoprene latex.

The usual rosin esters that come within the purview of the present invention are well known. They generally are terpenoid esters such as esters of abietic acid, hydrogenated abietic acid, disproportionated abietic acid, or polymerized abietic acid. Normally, these are lower alkyl esters, but this is not a critical limitation. Such resins are readily available commercially from many sources.

Zinc oxide and magnesium oxide which are used in the compositions of the present invention preferably should have a surface area of at least 2 $m^2/g$ because such materials can be easily maintained in suspension. They too are available commercially from several sources. Zinc oxide is the preferred metal oxide because the long term cure properties of the copolymer obtained with it are superior.

The compositions of the present invention should preferably contain about 50 to 60 weight percent of solids. Within this preferred range, there is obtained the optimum balance between the viscosity of the composition and its ability to dry to form adhesive film.

Various conventional ingredients that are or may be added to the compositions of the present invention include, e.g., antioxidants, curatives such as, e.g., epoxy compounds, additional stabilizers, surfactants, etc. Optionally, a gum rosin ester also may be added to the composition to improve tack. If gum rosin ester is present in the composition, its amount is about 5 to 50 parts, based on 100 parts of chloroprene copolymer.

The preferred amount of DCBD in the copolymer is 4 to 10 weight percent because this provides the best improvement of low temperature properties of the copolymers vs. additional cost.

In use, the neoprene adhesive composition is applied to both surfaces to be bonded, which then are mated with each other. In practice, the bonding operation is carried out within a temperature range of about 20° C.-100° C., but when the adhesive is used in conjunction with postforming, the process temperature may be as high as 120° C. or higher. The adhesive material of the present invention can withstand such temperatures very well, without losing its bond strength to a substantial degree.

This invention is now illustrated by the following representative examples of certain preferred embodiments thereof, where all parts, proportions, and percentages are by weight, unless otherwise indicated. All units of weight and measure that were originally obtained in units other than SI have been converted to SI units.

COPOLYMERIZATION AND FORMULATION

Example 1

Chloroprene (92 parts), 8 parts of DCBD, and 0.16 part of diisopropylxanthogen disulfide (DPXD) were emulsified in 60 parts of water disulfide (DPXD) were emulsified in 60 parts of water with 2.3 parts of potassium salt of disproportionated abietic acid, 0.9 part of potassium salt of a condensate of naphthalenesulfonic acid with formaldehyde, and 0.15 part of dimer acid, and stabilized with 0.002 part of p-tert-butylcatechol. The emulsified monomers were copolymerized under an atmosphere of nitrogen at 20° C. by a redox/free radical initiator system of dextrose, potassium sulfite, sodium 2-anthraquinonesulfonate, and potassium persulfate (2.5%). When 85 percent conversion was reached, the polymerization was stopped by the addition of phenothiazine, and the aqueous dispersion was stabilized with the sodium salt of disproportionated abietic acid. The unpolymerized monomers were steam-distilled in a separate apparatus at a reduced pressure. There were then added to the copolymer latex 35 parts of rosin ester having a softening point above 85° C., 3 parts of zinc oxide having a surface area of 2 $m^2/g$, and 1.5 parts of 2,2'-methylene-bis(4-methyl-6-tert-butyphenol) antioxidant, available from American Cyanamid Co. under the name Antioxidant 2246 (as ball-milled aqueous dispersions).

Examples 2-3 and Comparative Examples A-D

The general procedure employed in Example 1 was modified as shown below in Table I. Examples 2 and 3 are within the scope of the present invention. Examples A-D are comparative examples.

TABLE I

|  | DCBD pts./100 | Temp., °C. | Telogen, pts./100 |
|---|---|---|---|
| Example 2 | 8 | 25 | PXD, 016 |
| Example 3 | 10 | 20 | PXD, 016 |
| Example A | 8 | 20 | Dodecyl mercaptan (DDM) 0.09 |
| Example B | Commercial neoprene latex L1 | | |
| Example C | Commercial neoprene latex L2 | | |
| Example D | 10 | 45 | PXD, 016 |

Latex L1 had 45% of solids; it contained a copolymer of 91.5 parts of chloroprene with 8.5 parts of DCBD modified with DDM (0.06 pt./100) and copolymerized in an anionic emulsion at 40° C.

Latex L2 had 56% of solids; it contained a chloroprene homopolymer modified with DDM (0.05 pt./100) and copolymerized in an anionic emulsion at 45° C.

Example 4

A copolymer of chloroprene with DCBD was prepared under the same conditions and using the same amounts of reactants as in Example 1, and the polymerization mixture was worked up as described there. A quantity of the resulting chloroprene copolymer latex, counted as containing 95 parts of chloroprene copolymer, was mixed with 5 parts of a DDM-modified chloroprene homopolymer made in an anionic emulsion at 14° C. and then was further mixed with 35 parts of gum rosin ester having a softening point above 90° C., 15 parts of rosin ester, 3 parts of zinc oxide, and 1.5 parts of Antioxidant 2246 (as a combined ball-milled aqueous dispersion). The purpose of chloroprene homopolymer was to adjust the room temperature bond strength development.

Examples 5-11

Diisopropylxanthogen disulfide-modified neoprene latex was prepared under the conditions shown in Table II, below.

TABLE II

|  | Comonomer pts./100 | Temp. °C. | DPXD pts./100 |
|---|---|---|---|
| Example 5 | 2 | 20 | 0.16 |
| Example 6 | 5 | 20 | 0.16 |

TABLE II-continued

|  | Comonomer pts./100 | Temp. °C. | DPXD pts./100 |
| --- | --- | --- | --- |
| Example 7 | 12 | 20 | 0.16 |
| Example 8 | 20 | 20 | 0.16 |
| Example 9 | 8 | 25 | 0.16 |
| Example 10 | 8 | 35 | 0.16 |
| Example 11 | 8 | 20 | 0.3 |

TESTING

Testing of the bonding characteristics of adhesives is a highly subjective art, and many tests have been developed to assist technologists in evaluating potential adhesive formulations. The tests described below were used to evaluate the present invention. The canvas used in the tests was an unsized, 10 oz (283 g) Blue Line Cotton Duck Canvas. The particleboard was a 0.72 g/cm³ density Western Cedar particle board. The High Pressure Laminate was Ralph Wilson Plastics Co. (Temple, Tex.) Wilsonart ® Brand General Purpose No. 107 Laminate, which had a thickness of 1.27 mm. The test specimens were conditioned at least 24 hours at ambient temperature and 50% relative humidity before testing.

Postformability

The relative ability of the adhesive to allow the high temperature bending of a high pressure laminate around the edge of the substrate support, e.g., for forming the edge of desks or countertops, is evaluated on a scale of 1 to 10 (10 is best). The test piece is a 2.5 by 10.2 cm High Pressure Laminate bonded with a 7.6 cm overhang to a 2.5 by 10.2 by 1.3 cm particle board. This bonded piece is heated at about 163° C. under an infrared lamp for two minutes, and then the laminate is separated in cleavage mode from the particle board by hand pressure and rated 1 to 10 versus a standard solvent-grade laminating adhesive, which is simultaneously subjected to the same procedure.

Tensile Bond Test

A High Pressure Laminate bonded to particle board (6.45 cm² bonding area) is separated under tensile stress and the strain is measured directly using a tensile tester such as, e.g. an Instron ® or United Tester ® instrument, with a load cell rated within the range of 0–1379 kPa.

Edge Separation

A High Pressure Laminate bonded to particle board (6.4×27.9 cm) at a specified bonding temperature, (25° C. or 72° C.) is conditioned at least 24 hours at ambient temperature and 50% relative humidity, then reheated to 70° C. The maximum separation of the High Pressure Laminate from the particle board due to laminate warpage stress is measured.

Static load

A 2.54×10.2 cm High Pressure Laminate is bonded with a 7.6 cm overlap to 2.54×10.2×1.3 cm particle board. This bonded composite piece is loaded under shear stress with 2.27 kg under static conditions in an oven, and the temperature is raised in 10° C. increments at 15 minute intervals to a final temperature of 120° C. The temperature of sample separation is recorded.

Contactability

The adhesive film-to-film binding is evaluated by bonding a 12.7×30.5 cm High Pressure Laminate to particle board under light hand pressure and separated slightly, versus standard solvent based adhesive bond. The results were rated as poor, good, and very good; solvent-based adhesive is rated excellent.

Tack

The stickiness of the film is evaluated by touching with a fingertip and is rated subjectively versus standard solvent-based adhesive.

The results of the evaluation tests that were carried out are summarized below in Tables III and IV.

TABLE III

|  | Example No. | | | | | | |
| --- | --- | --- | --- | --- | --- | --- | --- |
|  | 3 | A | 1 | 2 | B | C | D |
| Postformability 25° C. Bonds | 9 | 4 | 9 | 7 | 5 | 4 | 5 |
| Tens. Bond Test, kPa | 531 | 365 | 241 | 448 | 600 | 441 | 496 |
| Fresh Edge Sep., cm | 0 | 0 | 0 | 0 | 0 | 0 | 0 |
| Static Load, °C. 72° C. Bonds | NF | 90 | 110 | NF | NF | NF | NF |
| Tens. Bond Test, kPa | 572 | 634 | 586 | 627 | 558 | 779 | 606 |
| Fresh Edge Sep., cm | 0 | 0 | 0 | 0 | 0 | 0 | 0 |
| Static Load | NF | NF | NF | NF | NF | NF | NF |

NF = no failure

The invention examples (1,2, and 3) show very good performance in the postformability test, while retaining a good balance of overall properties. The comparative examples (A, B, C, and D) show significantly poorer performance in the high temperature postformability tests.

TABLE IV

|  | Example | | | | | | | |
| --- | --- | --- | --- | --- | --- | --- | --- | --- |
|  | 9 | 5 | 6 | 7 | 8 | 4 | 10 | 11 |
| Postformability | 8 | 8 | 7 | 7 | 8 | 9 | 8 | 9 |
| Fresh Edge Sep. | 0 | 0 | 0 | 0 | 0 | 0 | 0 | 0 |
| Aged Edge Sep. | 0 | 0 | 0 | 0 | 0 | 0 | 0 | 0 |
| Static load °C. | 120+ | 120+ | 120+ | 120+ | 120+ | 120+ | 120+ | 120+ |
| Tens. bond, kPa | 551 | 524 | 544 | 503 | 558 | 462 | 545 | 462 |
| Contactability | G | F | G | G | G | G | VG | VG |
| Tack | G | P | G | G | G | G | G | G |

120+ = no failure at 120° C.
P = poor, F = fair, G = good, VG = very good

These examples show excellent results in the postformability tests. The samples also retained superior properties in the other bonding tests, except that both contactability and tack of the sample of Example 5 were below average. It has to be kept in mind, however, that both contactability and tack are measured in this test at ambient temperature. Both properties improve with increasing temperatures, so that even the sample of Example 5 would be suitable for postforming bonding.

Example 12

A composition of Example 10 was successfully used to make a countertop by postforming a High Pressure Laminate on wood particle board with a 180° wrap-around. The Ralph Wilson Plastics Co. Wilsonart ® Brand 0.76 mm-thick Postforming-Grade Laminate No. 350 and particle board were coated with adhesive and bonded together with an 8 cm overhang of laminate. The bonded countertop was run through the heating section of the postforming line at about 163° C. (residence time about 20 seconds), and the overhanging section of the laminate was bent around the edge of the countertop (2.54 cm radius, 180° wrap). The edge was held in place with rollers about 1 meter past the forming section, then released. There was no edge separation as the completed countertop was cooled, and finished.

I claim:

1. An adhesive composition particularly suitable for use in applications requiring postforming consisting essentially of about 100 parts of a copolymer of 2-chloro-1,3-butadiene with 2,3-dichloro-1,3-butadiene, the proportion of 2,3-dichloro-1,3-butadiene being 2% to 20% based on the total weight of the copolymer, 15 to 75 parts of rosin ester; 1 to 10 parts of a metal oxide selected from the group consisting of zinc oxide and magnesium oxide, all parts being by weight; and a sufficient amount of water to make the solids content of the composition 40–65 weight percent;

with the proviso that said copolymer of 2-chloro-1,3-butadiene with 2,3-dichloro-1,3-butadiene is prepared by free radical emulsion copolymerization of the comonomers in the presence of 0.05 to 0.3 weight percent of a dialkylxanthogen disulfide, based on the total weight of the two comonomers, at a temperature within the range of about 0° C. to 35° C.

2. A composition of claim 1 wherein the amount of 2,3-dichloro-1,3-butadiene in the copolymer is 4–10 weight percent.

3. A composition of claim 1 wherein the amount of solids is 50–60 weight percent.

4. A composition of claim 1 wherein the metal oxide has a surface area of at least 2 m²/g.

5. A composition of claim 1 wherein the copolymer of 2-chloro-1,3-butadiene with 2,3-dichloro-1,3 butadiene is made at a temperature of at most 25° C.

6. An adhesive composition of any one of claims 1–5 further containing at least one additional component selected from the group of stabilizers, surfactants, antioxidants, and gum rosin esters; the gum rosin esters, if present, being about 5–50 parts by weight, based on 100 parts by weight of the chloroprene copolymer.

7. A structure comprising at least two layers of the same or different materials bonded to one another with an adhesive composition consisting essentially of about 100 parts of a copolymer of 2-chloro-1,3-butadiene with 2,3-dichloro-1,3-butadiene, the proportion of 2,3-dichloro-1,3-butadiene being 2% to 20% based on the total weight of the copolymer; 15 to 75 parts of rosin ester; 1 to 10 parts of a metal oxide selected from the group of zinc oxide and magnesium oxide, all parts being by weight; and a sufficient amount of water to make the solids content of the composition 40–65 weight percent;

with the proviso that said copolymer of 2-chloro-1,3-butadiene with 2,3-dichloro-1,3-butadiene is prepared by free-radical emulsion copolymerization of the comonomers in the presence of 0.05 to 0.3 weight percent of a dialkylxanthogen disulfide, based on the total weight of the two comonomers, at a temperature within the range of about 0° C. to 35° C.;

said structure being capable of withstanding a temperature of at least 120° C. without separation of the layers.

8. A structure of claim 7 which is capable of withstanding a temperature of about 163° C. without delamination.

9. A structure of claim 7 wherein the adhesive composition further contains at least one additional component selected from the group of stabilizers, surfactants, antioxidants, and gum rosin esters; the amount of gum rosin esters, if present, being about 5–50 parts by weight, based on 100 parts by weight of the chloroprene polymer.

10. A composite structure of any one of claims 7 through 9 wherein the copolymer of 2-chloro-1,3-butadiene with 2,3-dichloro-1,3-butadiene in the adhesive composition is made at a temperature within the range of 0° C. to 25° C., and the amount of 2,3-dichloro-1,3-butadiene in the copolymer is 4–10 weight percent.

* * * * *